US012150400B2

(12) United States Patent
Yuan et al.

(10) Patent No.: US 12,150,400 B2
(45) Date of Patent: Nov. 26, 2024

(54) METHOD AND APPARATUS USING SEMI-SUPERVISED DEEP CONVOLUTION NEURAL NETWORK FOR CROP YIELD ESTIMATION IN INTELLIGENT AGRICULTURE (71) Applicant: City University of Hong Kong, Hong Kong (HK)

(72) Inventors: Yixuan Yuan, Hong Kong (HK); Xiaochun Mai, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 417 days.

(21) Appl. No.: 17/540,235

(22) Filed: Dec. 2, 2021

(65) Prior Publication Data
US 2023/0172091 A1    Jun. 8, 2023

(51) Int. Cl.
*G06V 20/17*  (2022.01)
*A01B 79/00*  (2006.01)
(Continued)

(52) U.S. Cl.
CPC .......... *A01B 79/005* (2013.01); *B64C 39/024* (2013.01); *G06N 3/04* (2013.01);
(Continued)

(58) Field of Classification Search
CPC ....... A01B 79/005; G06T 7/55; G06T 11/001; G06T 2207/10032; G06T 2207/20081;
(Continued)

(56) References Cited

U.S. PATENT DOCUMENTS

2018/0211156 A1* 7/2018 Guan ............... G06N 3/044
2022/0358265 A1* 11/2022 Wang ............... G06F 30/27

FOREIGN PATENT DOCUMENTS

CN    104200193 A    12/2014
CN    110728413 A    1/2020
(Continued)

OTHER PUBLICATIONS

Xiao (A Density Map Estimation Model with DropBlock Regularization for Clustered-Fruit Counting), IEEE p. 5512-5519 (Year: 2019).*

(Continued)

*Primary Examiner* — Manish S Shah
*Assistant Examiner* — Sharad Timilsina
(74) *Attorney, Agent, or Firm* — IDEA Intellectual Limited; Margaret A. Burke; Sam T. Yip (57) ABSTRACT A method for performing a crop yield estimation using a semi-supervised deep convolution neural network is provided. The method includes receiving monitoring data from a drone, wherein the monitoring data comprises a video of the crops captured by the drone; sampling the video by a predefined frame rate to obtain one or more images; inputting the images to a crop yield estimation model to obtain one or more result data, wherein the crop yield estimation model comprises a generator and a discriminator each comprising one or more DCNNs, and wherein the crop yield estimation model is trained by a semi-supervised learning method; and performing a quantity estimation and a quality estimation corresponding to the crops as shown in the images according to the one or more result data, so as to determine a total number and maturities of the crops respectively.

11 Claims, 9 Drawing Sheets

(51) Int. Cl.
| | |
|---|---|
| *B64C 39/02* | (2023.01) |
| *B64U 101/30* | (2023.01) |
| *G06N 3/04* | (2023.01) |
| *G06N 3/08* | (2023.01) |
| *G06T 7/55* | (2017.01) |
| *G06T 11/00* | (2006.01) |
| *G06V 10/82* | (2022.01) |
| *G06V 20/10* | (2022.01) |

(52) U.S. Cl.
CPC ............... *G06N 3/08* (2013.01); *G06T 7/55* (2017.01); *G06T 11/001* (2013.01); *G06V 10/82* (2022.01); *G06V 20/17* (2022.01); *G06V 20/188* (2022.01); *B64U 2101/30* (2023.01); *G06T 2207/10032* (2013.01); *G06T 2207/20081* (2013.01); *G06T 2207/20084* (2013.01); *G06T 2207/30188* (2013.01); *G06T 2207/30242* (2013.01)

(58) Field of Classification Search
CPC . G06T 2207/20084; G06T 2207/30188; G06T 2207/30242; G06V 20/17; G06V 10/82; G06V 20/188; B64C 39/024; G06N 3/04; G06N 3/08; B64U 2101/30
See application file for complete search history.

(56) References Cited

FOREIGN PATENT DOCUMENTS

| | | | |
|---|---|---|---|
| CN | 112233121 A | | 1/2021 |
| CN | 113344968 A | * | 9/2021 |
| CN | 113763196 A | * | 12/2021 |
| MY | 164924 A | | 2/2018 |

OTHER PUBLICATIONS

A density Map estimation model (Year: 2019).*
Bellocchio, Enrico, et al. "Weakly supervised fruit counting for yield estimation using spatial consistency" IEEE Robotics and Automation Letters 4.3 (2019): 2348-2355.
Mai, Xiaochun, et al. "A Density Map Estimation Model with DropBlock Regularization for Clustered-Fruit Counting" 2019 IEEE/RSJ International Conference on Intelligent Robots and Systems (IROS). IEEE, 2019, p. 5512-5519.
Chen, Steven W., Shreyas S. Shivakumar, Sandeep Dcunha, Jnaneshwar Das, Edidiong Okon, Chao Qu, Camillo J. Taylor, and Vijay Kumar. "Counting apples and oranges with deep learning: A data-driven approach" IEEE Robotics and Automation Letters 2, No. 2 (2017): 781-788.

* cited by examiner

METHOD AND APPARATUS USING SEMI-SUPERVISED DEEP CONVOLUTION NEURAL NETWORK FOR CROP YIELD ESTIMATION IN INTELLIGENT AGRICULTURE

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to the field of crop yield estimation, and in particular, to machine learning techniques for crop yield estimation according to videos captured by a drone.

BACKGROUND OF THE INVENTION

With worldwide population growth and increasingly scarce cultivated lands, the global food supply becomes more and more stretched. Researches over the last decades demonstrate that automatic and precision management of different parts of food production using computer vision techniques can improve crop yields. In the precision management of fruit production, automatic yield estimation is essential, and many fully supervised deep learning methods have contributed greatly in this area. However, the supervised learning methods require many annotated labels as ground truth during their training, and the label annotation is expensive and laborious. In practice, when transferring a fully supervised network to a new category of crops, it needs to be re-trained with the annotated images of the new crops.

Therefore, there is a need in the art for a new learning method other than the fully supervised learning method for neural network training, so as to reduce the laborious work needed in the image re-labelling and re-training.

SUMMARY OF THE INVENTION

An objective of this invention is to provide a semi-supervised deep neural network for crop yield estimation of which the training uses a limited number of "labeled" images and many "unlabeled" images, addressing the afore-mentioned shortcoming in the current state of the art.

In accordance to one aspect of the present invention, a computer-implemented method for performing a crop yield estimation in intelligent agriculture using a semi-supervised deep convolution neural network is provided. The method comprises: receiving, by a processor of an analysis server, a monitoring video from a drone equipped with an optical sensor video-capturing one or more crops; sampling, by the processor, the monitoring video by a predefined frame rate to obtain one or more images, wherein each of the images is showing one or more of the crops; inputting the images to a crop yield estimation model to obtain result data, wherein the crop yield estimation model comprises a generator and a discriminator each comprising one or more deep convolution neural networks (DCNNs), and wherein the crop yield estimation model is trained by a semi-supervised learning method; and performing a quantity estimation corresponding to the crops as shown in each of the images according to the result data, so as to determine a total number of the crops.

The method for performing a crop yield estimation further comprises: receiving training data comprising one or more first images and one or more second images, wherein a center of each of one or more crops in the first images is labelled by an indicator, and the second images are gray scale images obtained by performing a CIELAB color space transformation on one or more third images in the RGB color space; inputting the first images to the generator to obtain one or more density maps corresponding to the first images; inputting the second images to the generator to obtain one or more ab-channel images corresponding to the second images; inputting the ab-channel images and one or more ground-truth (GT) ab-channel images corresponding to the ab-channel images to a first loss function to output first loss data corresponding to the ab-channel images, wherein the GT ab-channel images are obtained by performing the CIELAB color space transformation on the third images; inputting the density maps and one or more GT density maps corresponding to the density maps to a second loss function to generate second loss data corresponding to the density maps, wherein the GT density maps are obtained by performing a gaussian distribution on the first images according to the indicators; fine-tuning one or more first parameters of the generator according to the first loss data and the second loss data; and performing an adversarial learning for training the generator and the discriminator according to one or more colorization images and one or more GT colorization images, wherein the GT colorization images are the third images and the colorization images are generated from the ab-channel images and the second images.

In accordance to another aspect of the present invention, an analysis server for performing the afore-described crop yield estimation is provided, and the analysis server comprises a processor configured to execute machine instructions to implement the method described above.

BRIEF DESCRIPTION OF THE DRAWINGS

Embodiments of the invention are described in more details hereinafter with reference to the drawings, in which.

DETAILED DESCRIPTION

In the following description, methods and systems for performing a crop yield estimation in intelligent agriculture using a semi-supervised deep convolution neural network and for training a crop yield estimation model are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1A:
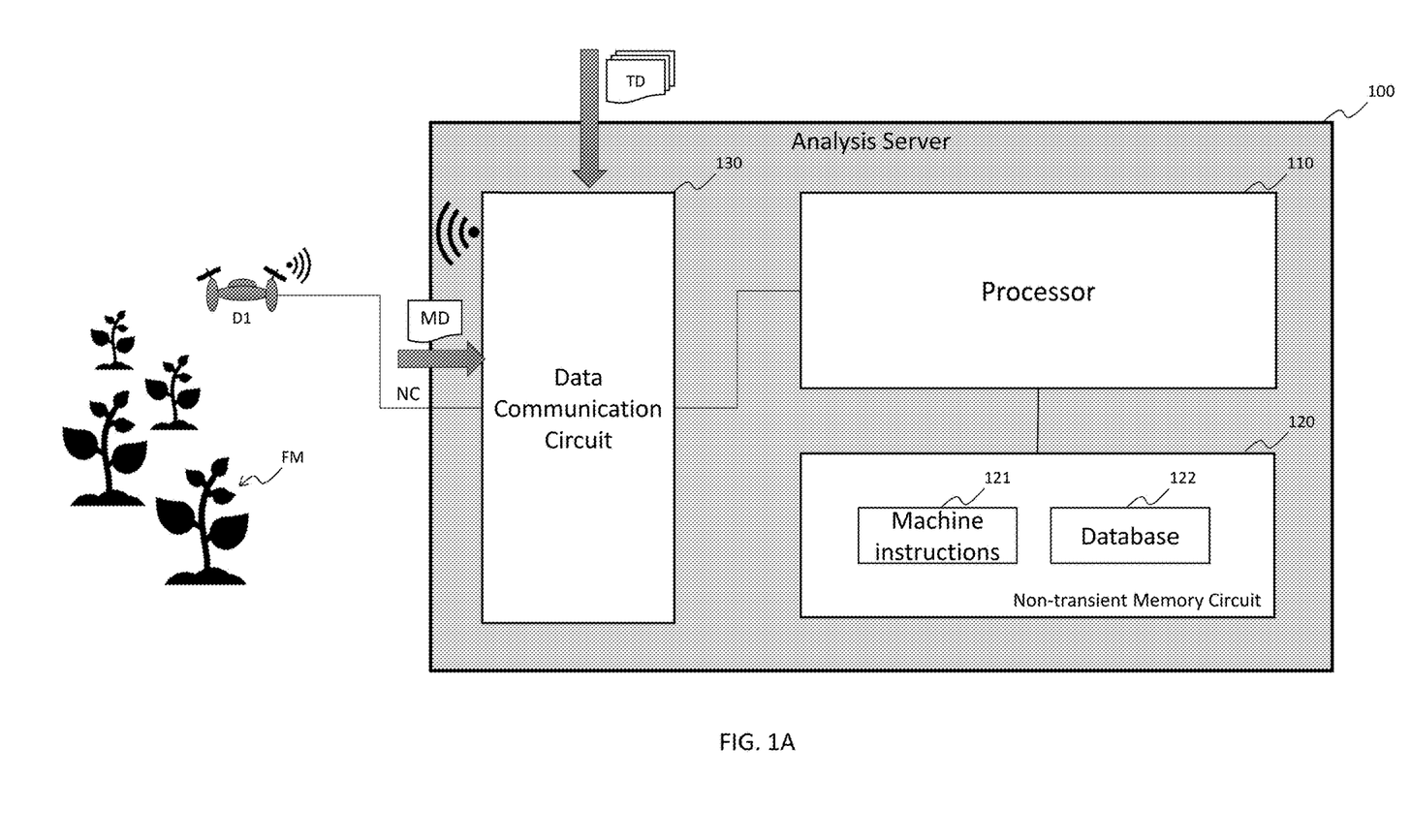
FIG. 1A depicts a block diagram illustrating an analysis server and a drone providing monitoring video of crops in a crop field in accordance with one embodiment of the present invention.

Referring to FIG. 1A for the following description. In accordance to various embodiments of the present invention, an analysis server 100 for performing a crop yield estimation in intelligent agriculture using a semi-supervised deep convolution neural network (DCNN) includes a processor 110, a non-transient memory circuit 120 and a data communication circuit 130.

In one embodiment, an image/video capture device D1, equipped with an optical sensor and is configured and/or operated during operation to travel to the locations of the crops (e.g., a crop field or greenhouse) to allow video-capturing of the crops, sends a monitoring data MD including a video of the crops captured by the image/video capture device to the analysis server 100 via an established network connection NC. For example, a drone may capture a video or multiple images of the crops in the farm FM via its camera while flying over it and send to the analysis server 100. In another embodiment, an image/video capture device further equipped with anon-transient memory circuit records and stores locally a monitoring data including a video of the crops captured by the image/video capture device. The monitoring data is then subsequently sent or uploaded to the analysis server. In both embodiments, the image/video capture device may be an aerial or land drone, fully autonomous or human-piloted/driven. The monitoring data MD may include meta data related to auxiliary information (e.g., identification of the drone, a further identification of the farm(s), recording time and date, weather, etc.).

The non-transient memory circuit 120 is configured to host the database 122. The database 122 may be used to store the monitoring data MD, training data TD, trained and untrained crop yield estimation models, and result data RD1 and RD2. The data communication circuit 130 is configured to establish the network connection NC with the drone D1, which may be a wired or wireless data communication connection.

The processor 110 executes the machine instructions 121 to implement methods for performing a crop yield estimation and for training a crop yield estimation model in intelligent agriculture provided by the presented disclosure.

Figure 1B:
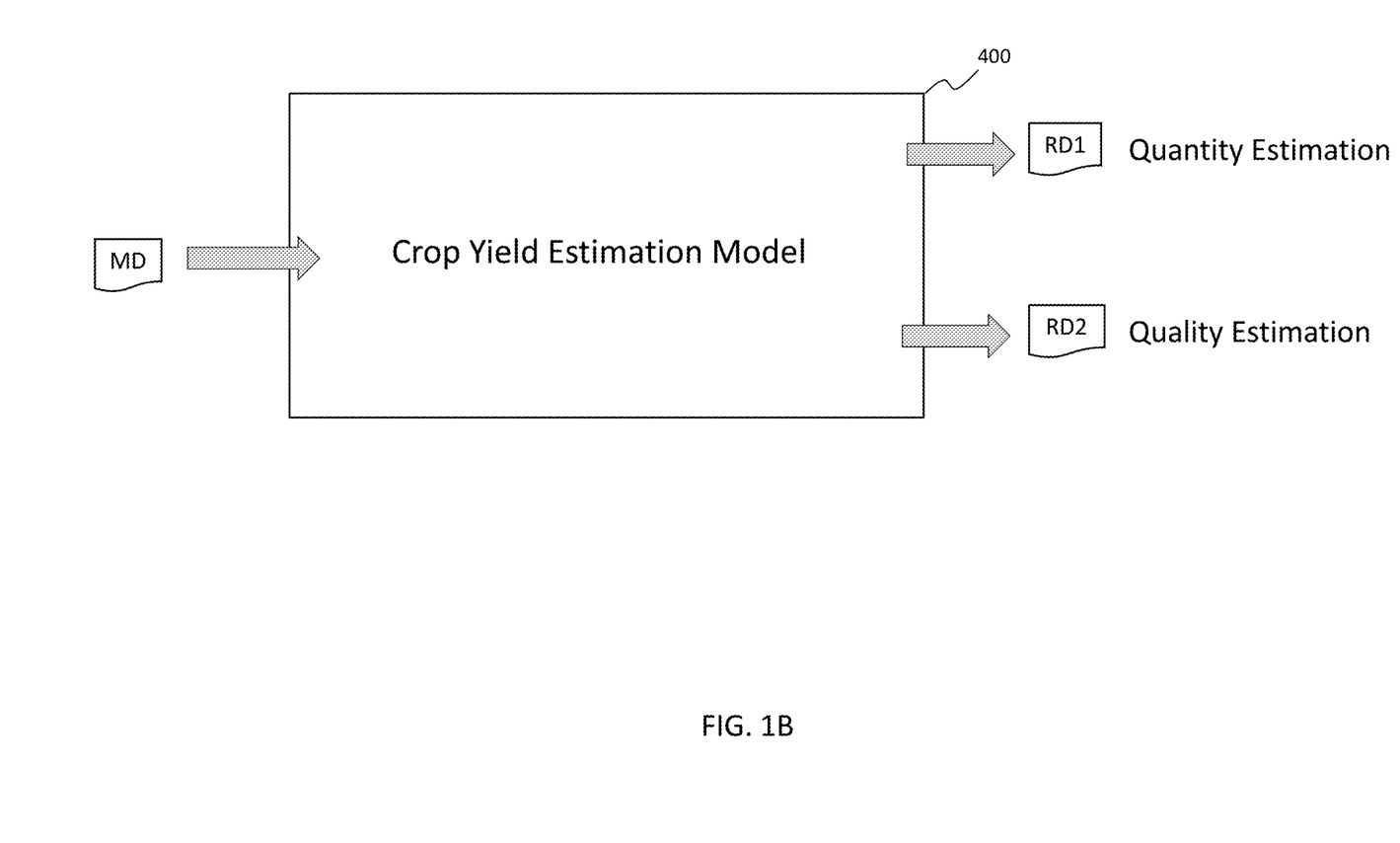
FIG. 1B depicts a schematic diagram illustrating a crop yield estimation model executed by the analysis server to output result data for a quantity estimation and a quality estimation according to inputted monitoring data.

Referring to FIG. 1B for the following description. The processor 110 receives and inputs the received monitoring data MD into the semi-supervised trained crop yield estimation model 400 to output first result data RD1 and second result data RD2. A quantity estimation of the crops as shown in the monitoring data MD is then performed according to the first result data RD1. Also, a quality and maturity estimation of the crops as shown in the monitoring data MD is performed according to the second result data RD2. The first result data RD1 may include one or more density maps corresponding to one or more images sampled from the monitoring data MD, and the second result data RD2 may include one or more maturity maps corresponding to the images.

Figure 2:
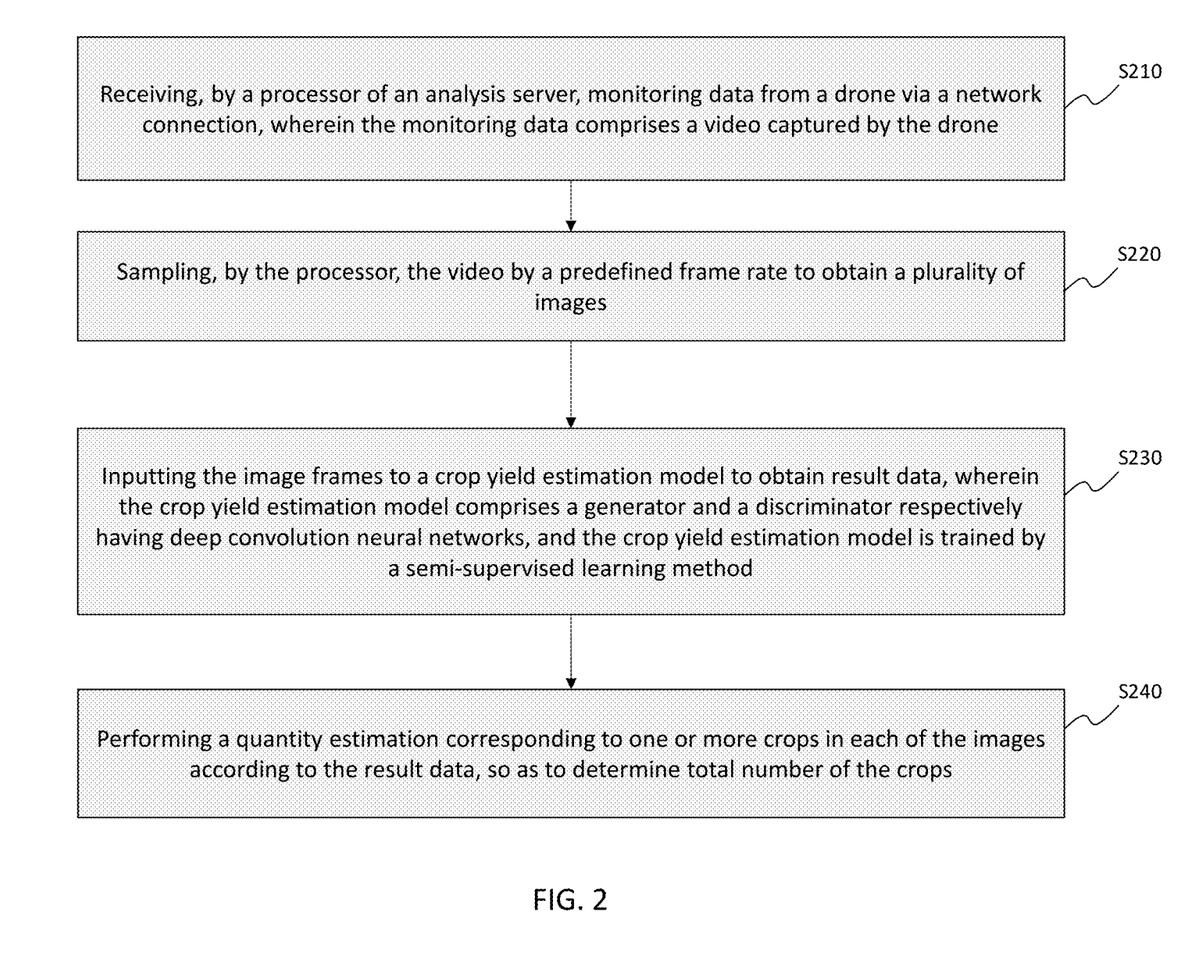
FIG. 2 depicts a flowchart of a crop yield estimation method using a semi-supervised deep convolution neural network (DCNN) in accordance with one embodiment of the present invention.

Referring to FIG. 2 for the following description. In step S210, the processor 110 receives monitoring data MD from a drone D1 via a network connection NC, wherein the monitoring data MD comprises a video captured by the drone D1. Next, in step S220, the processor 110 samples the video by a predefined frame rate (e.g., 30 fps) to obtain one or more images. There may be overlapping impressions of the crops appearing in two consecutive (or adjacent) images. The resolution of each image can be set to e.g., 1920×1080 or any other resolution supported by the optical sensor of the drone. Furthermore, the pixel color information of the images is presented in the RGB color space.

Next, in step S230, the processor 110 inputs the images to a crop yield estimation model to obtain result data, wherein the crop yield estimation model comprises a generator and a discriminator each comprising one or more DCNNs, and wherein the crop yield estimation model is trained by a semi-supervised training method.

Next, in step S240, the processor 110 performs a quantity estimation corresponding to one or more crops (impressions of crops) on each of the images according to the result data, so as to determine a total number of the crops. The processor 110 further performs a quality estimation corresponding to the crops according to the result data, so as to determine the maturities of the crops. This way, the analysis server 100 can monitor the conditions of the crops yield; in turn, the harvest timing and the harvest amount of the monitored crops can be managed accordingly.

Figure 3:
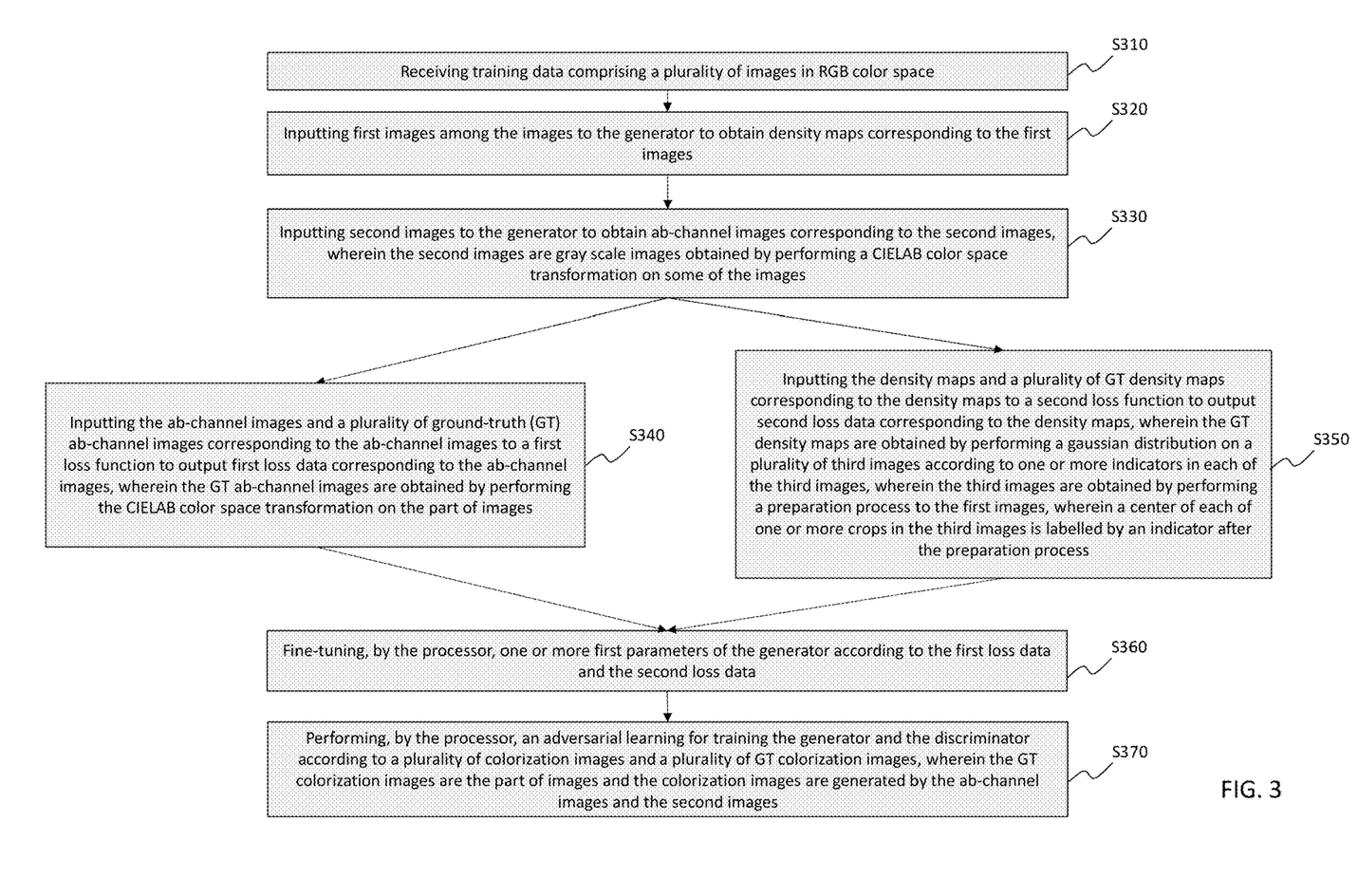
FIG. 3 depicts a flowchart of a crop yield estimation model training method using a semi-supervised deep convolution neural network (DCNN) in accordance with one embodiment of the present invention.

Referring to FIG. 3 for the following description. In step S310, the processor 110 receives training data TD comprising one or more images. Next, in step S320, the processor 110 inputs one or more first images to the generator to obtain one or more density maps corresponding to the first images, wherein the first images are selected among the images in the training data TD. Next, in step S330, the processor 110 inputs one or more second images to the generator to obtain one or more ab-channel images corresponding to the second images, wherein the second images are gray scale images obtained by a CIELAB color space transformation performed on some of the images.

Figure 4A:
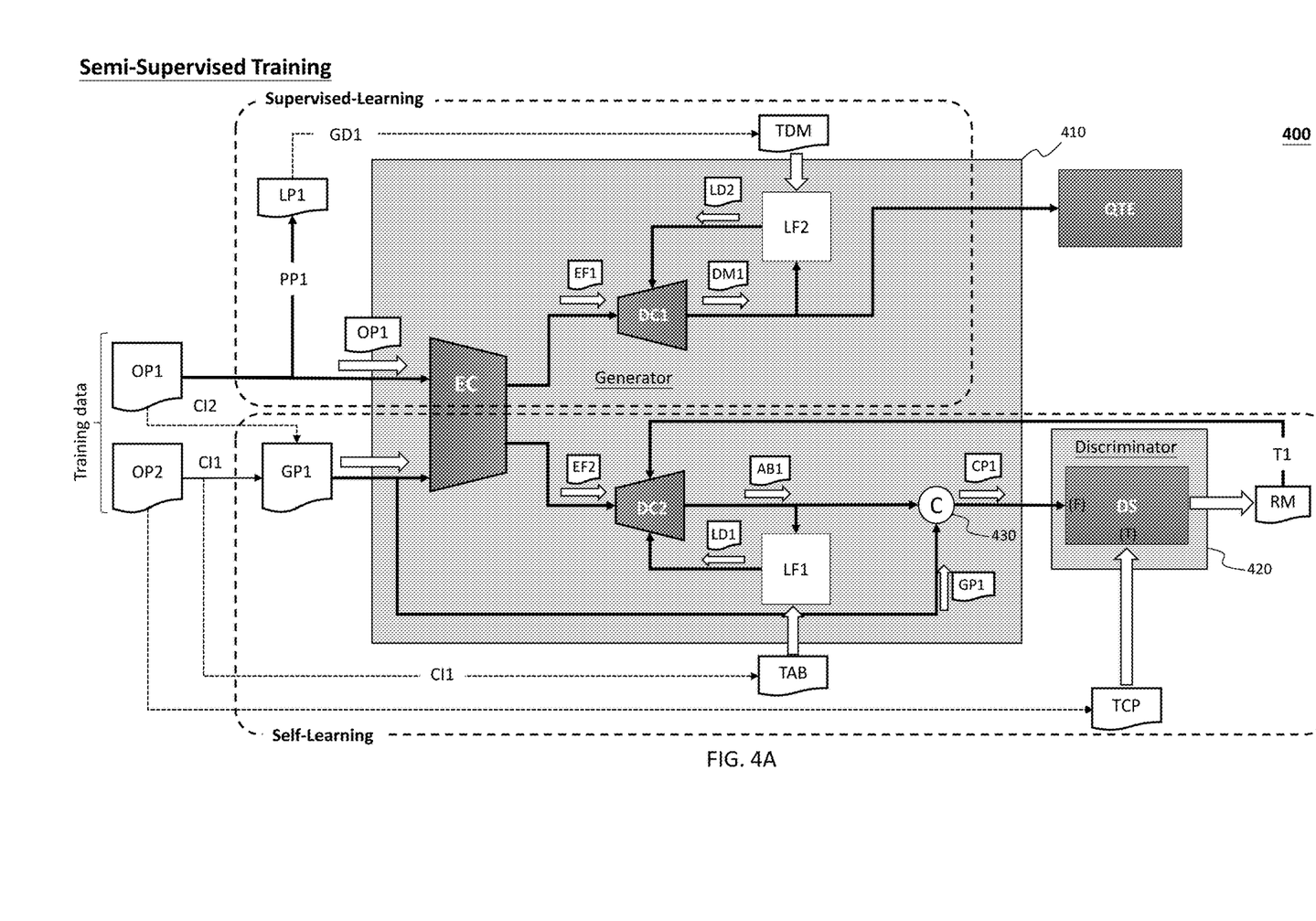
FIG. 4A depicts a schematic diagram illustrating a semi-supervised training flow for training the crop yield estimation model in accordance with one embodiment of the present invention.
Figure 4B:
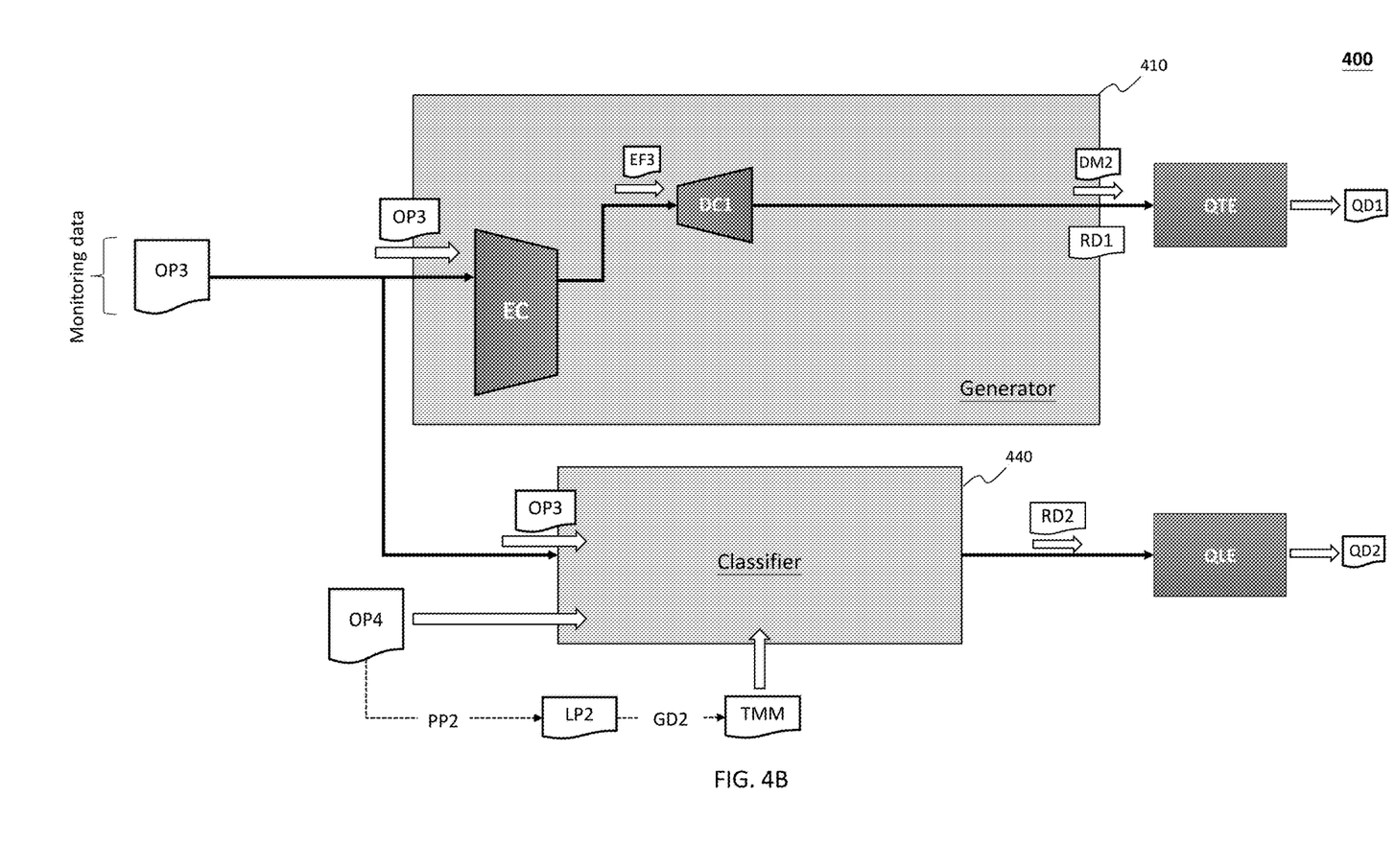
FIG. 4B depicts a schematic diagram illustrating a data-flow of using the trained crop yield estimation model for a quantity estimation and a quality estimation.

Referring to FIGS. 4A and 4B for the following description. Color information of pixels of each the images of the training data TD are recorded in the RGB color space. Some of the images, which are selected for the first images OP1, are inputted to the generator 410 of the crop yield estimation model 400. The rest of the images (ex-first images) OP2 are transformed or converted into second images GP1 by the CIELAB color space transformation CI1. The CIELAB color space expresses three values: L* (L-channel) for perceptual lightness, and a* and b* (ab-channel) for the four unique colors of human vision: red, green, blue, and yellow. The gray scale image is the L-channel image of the CIELAB color space of an image. In other words, after the CIELAB color space transformation CI1 performed on the images OP2, the processor 110 obtains the L-channel images, which are gray scale images GP1 (e.g., second images) being inputted to the generator 410, and the ab-channel images, which are used as ground-truth (GT) ab-channel images TAB. The second images GP1 may further include images that are obtained by a further CIELAB color space transformation CI2 performed on the first images OP1.

The generator 410 comprises an encoder EC and two decoders DC1 and DC2. The processor 110 inputs the first images OP1 to the encoder EC to obtain one or more first encoded features EF1 corresponding to the first images OP1, and inputs the second images GP1 to the encoder EC to obtain one or more second encoded features EF2 corresponding to the second images GPL.

Furthermore, the processor 110 inputs the first encoded features EF1 to a first decoder DC1 among the decoders to obtain the density maps DM1 corresponding to the first images OP1 by mapping each of the first encoded features EF1 to a density map; and inputs the second encoded features EF2 to a second decoder DC2 among the decoders to obtain the ab-channel images AB1 corresponding to the second images GP1 by mapping each of the second encoded features EF2 to an ab-channel image.

Next, in step S340, the processor 110 inputs the ab-channel images AB1 and one or more GT ab-channel images TAB corresponding to the ab-channel images to a first loss function LF1 to obtain first loss data LD1 corresponding to the ab-channel images, wherein the GT ab-channel images TAB are obtained by the CIELAB color space transformation CI1 performed on the images OP2. Specifically, for each of ab-channel images AB1 generated according to a particular one of the second encoded features EF2 of a particular one of the second images GP1, the processor 110 inputs a corresponding GT ab-channel image, which is generated by the CIELAB color space transformation performed on the particular image among the images OP2, and the one ab-channel image to the first loss function LF1 to generate the first loss data LD1. The first loss data LD1 can be represented by a $L_1$ loss function of adversarial learning between the generator 410 and the discriminator 420. The first loss function LF1 can be formulated according to equation (1) below.

$$\mathcal{L}_1(G,D) = \mathbb{E}_{x,y_2}[\log D(y_2)] + \mathbb{E}_{x,z_2}[\log(1-D(x, G(x,z_2)))] \quad (1)$$

where $L_1$ denotes the $L_1$ loss function; G(•) denotes the mapping function of the generator 410; D(•) denotes the mapping function of the discriminator 420 for fake colorization detection; x denotes the input image (e.g., generated ab-channel images AB1); $y_1$ denotes the GT density map TDM; $y_2$ denotes the GT colorization image TCP; $z_1$, $z_2$ denotes the random noise vectors; and $\mathbb{E}$ denotes the math expectation which means the average value of losses over training data.

Furthermore, in step S350, the processor 110 inputs the density maps DM1 and one or more GT density maps corresponding to the density maps DM1 to a second loss function LF2 to generate second loss data LD2 corresponding to the density maps DM1, wherein the GT density maps are obtained by a gaussian distribution GD1 performed on one or more third images LP1 according to one or more indicators in each of the third images LP1, wherein the third images LP1 are obtained by a preparation process PP1 performed on the first images OP1, and wherein a center of each of one or more crops (the impressions of crops) in the third images LP1 is labelled by an indicator after the preparation process PP1.

Specifically, the GT density map TDM is a matrix indicating the location(s) of crop(s) (the impression(s) of crop(s)) in an image. Each crop is represented by a Gaussian matrix. In the preparation process, each image is annotated by, for example, an annotation tool called "agdss" tool which labels each crop by drawing a circle on the crop. When a circle is annotated on each crop, the center coordinates of each crop (impression of crop) in the image can be obtained correspondingly. The element with peak value in a Gaussian matrix represents the crop center. Values of elements around the central element obey a Gaussian distribution. The sum of a Gaussian matrix is equal to 1, which represents the number of a crop. Then, the sum of all the Gaussian matrices in the density map represents the number of crops as shown in the corresponding image (e.g., the sum of all the Gaussian matrices in one GT density map TDM represents the number of crops as shown in the corresponding third image LP1). For generating the GT density maps, the standard deviation of Gaussian kernel is set to 4.0. Since a supervised preparation process PP1 is needed for training the encoder EC and the first decoder DC1, the corresponding training procedure thereof can be referred to as "supervised-learning". On the other hand, the training for the encoder EC and the second decoder DC1 does not need the supervised preparation process PP1, the corresponding training procedure thereof can be referred to as "self-learning". Therefore, the entire training procedure for the crop yield estimation model is referred to as "Semi-Supervised Training".

For each of density maps DM1 generated according to a particular one of first encoded feature EF1 of first image OP1, the processor 110 input a corresponding one of the GT density maps TDM and the one of density maps DM1 to the second loss function LF2 to generate the second loss data LD2. The second loss data LD2 can be represented by a $L_2$ loss function of generator 410 for density map generation and colorization generation. The second loss function LF2 can be formulated according to equation (2) below.

$$\mathcal{L}_2(G) = \mathbb{E}_{x,y_1,z_1}[\|y_1 - G(x,z_1)\|_2] + \mathbb{E}_{x,y_2,z_2}[\|y_2 - G(x,z_2)\|_1]; \quad (2)$$

where $L_2$ denotes the $L_2$ loss function; G(•) denotes the mapping function of the generator 410; D(•) the mapping function of the discriminator 420 for fake colorization detection; x denotes the input image (e.g., generated density maps DM1); $y_1$ denotes the GT density map TDM; $y_2$ denotes the GT colorization image TCP; $z_1$, $z_2$ the random noise vectors.

The loss between each of the density maps DM1 and the corresponding GT density map is Mean Square Error (MSE), while the loss between each of the ab-channel images AB1 and the corresponding GT ab-channel image is the $L_1$ loss.

Next, in step S360, the processor 110 fine-tunes one or more first parameters of the generator according to the first loss data LD1 and the second loss data LD2.

Next, in step S370, the processor 110 performs an adversarial learning for training the generator 410 and the discriminator 420 according to one or more colorization images CP1 and one or more GT colorization images TCP, wherein the GT colorization images TCP are the images OP2 and the colorization images CP1 are generated by the ab-channel images AB1 and the second images GP1.

Specifically, the processor 110 performs RGB transformation 430 on one or more feature concatenations of the ab-channel images AB1 and corresponding second images GP1 to obtain one or more colorization images CP1; and performing an adversarial learning for training the discriminator 420 and the generator 410 according to the colorization images CP1 and one or more GT colorization images TCP, wherein the GT colorization images are the images OP2.

About the feature concatenation, for example, concatenating feature "A" having dimension of [N, C1, H, W] with feature "B" having dimension of [N, C2, H, W] means concatenating the two matrices along the second dimension. The resulting feature will have a dimension of [N, C1+C2, H, W].

In the RGB transformation 430, for each inputted second image GP1, a L*a*b* channel image in the CIELAB color space can be obtained by concatenating the second image GP1 (gray scale image) and the ab-channel image AB1 within the CIELAB color space. Then, the obtained L*a*b* channel image is converted/transformed to RGB color space, so as to obtain a corresponding colorization image CP1 in the RGB color space.

In more details, the processor 110 inputs the colorization images CP1 with one or more false indicators (F) to the discriminator 420 (e.g., the discriminator 420 would determine that all the colorization images CP1 as fake); inputs the GT colorization images with one or more true indicators (T) to the discriminator 420 (e.g., the discriminator 420 would determine that all the GT colorization images TCP as real), so as to fine-tune one or more second parameters of the discriminator 420 to make the discriminator 420 distinguish the colorization images as false and the GT colorization images as true. Then, as illustrated by arrow T1, the processor 110 inputs one or more result matrices RM outputted by the discriminator 420 to the generator 410 to fine-tune one or more third parameters of the generator 410.

The third parameters can be optimized according to the equation (3) below.

$$G^* = \arg \min_G \max_D \lambda_1 \mathcal{L}_1(G,D) + \lambda_2 \mathcal{L}_2(G); \quad (3)$$

where $L_1$ denotes the $L_1$ loss function; $L_2$ denotes the L2 loss function; G denotes the generator 410; D denotes the discriminator 420 for fake colorization detection; $\lambda_1$ denotes the weight of $L_1$ loss in the total loss function; and $\lambda_2$ denotes the weight of L2 loss in the total loss function.

After training the crop yield estimation model 400 with the training data TD, when receive monitoring data MD, the processor 110 inputs the monitoring data TD into the trained crop yield estimation model to obtain result data RD1 and RD2. Furthermore, the trained crop yield estimation model 400 is evaluated by testing it with testing data. In the evaluation, the trained model takes a RGB image and a gray scale image as input and outputs estimated crop quantity and a generated colorization image. For density map evaluation, Mean Square Error (MSE), Mean Average Error (MAE), and ratio of counting are used. MSE (or MAE) is calculated from the MSE (or MAE) error between the estimated crop quantities and GT crop quantities over all the testing data. Ratio of counting denotes the average ratio of the crop quantity estimated via density map over the GT crop quantity as shown in the images. For colorization evaluation, both qualitative comparison and quantitative metric PSNR and SSIM for measurement for the generated colorization images and the GT colorization images are used. The higher the PSNR and SSIM, the better the colorization estimation.

Referring to FIG. 4B for the following description. For example, the processor 110 samples the video in the monitoring data MD to obtain one or more images OP3. Then, the processor 110 inputs images OP3 to the encoder EC to obtain encoded features EF3, and inputs the encoded features EF3 to the first decoder DC1 to obtain the density maps DM2 (result data RD1). Furthermore, the result data RD1 can be inputted to a quantity estimator QTE to calculate the sum of the values of matrices in each of the density maps of the result data RD1, so as to obtain the amount of the crops as shown in each of images. Then, the quantity estimator QTE further identifies the overlapping impressions of the crops appearing in two consecutive (or adjacent) images, so as to calculate the total number of the crops in the crop field as captured in the video of the monitoring data. The calculated total number of the crops in the crop field can be complemented by the auxiliary information in the monitoring data to generate quantity data QD1 corresponding to the images OP3.

In another aspect, the processor 110 inputs images OP3 to a classifier 440 of the crop yield estimation model 400 to obtain result data RD2. The result data RD2 includes one or more maturity maps, and each of the maturity maps includes one or more maturity matrices corresponding to one or more crops as shown in each input image OP3. Each of the maturity matrix indicates a maturity score of the corresponding crop, and the maturity score can be learned and generated by a quality estimation training process. For example, during the quality estimation training process, the processor 110 inputs one or more training images OP4 and one or more GT maturity maps TMM corresponding to the training images OP4 to the classifier 440, so as to fine-tune one or more fourth parameters of the classifier 440. The GT maturity maps TMM can be obtained, for example, by performing a Gaussian distribution on one or more labelled images LP2, wherein the labelled images LP2 are generated by another preparation process PP2, and each crop as shown in the labelled images LP2 is annotated by a maturity value indicating the maturity of the that crop.

Figure 5:
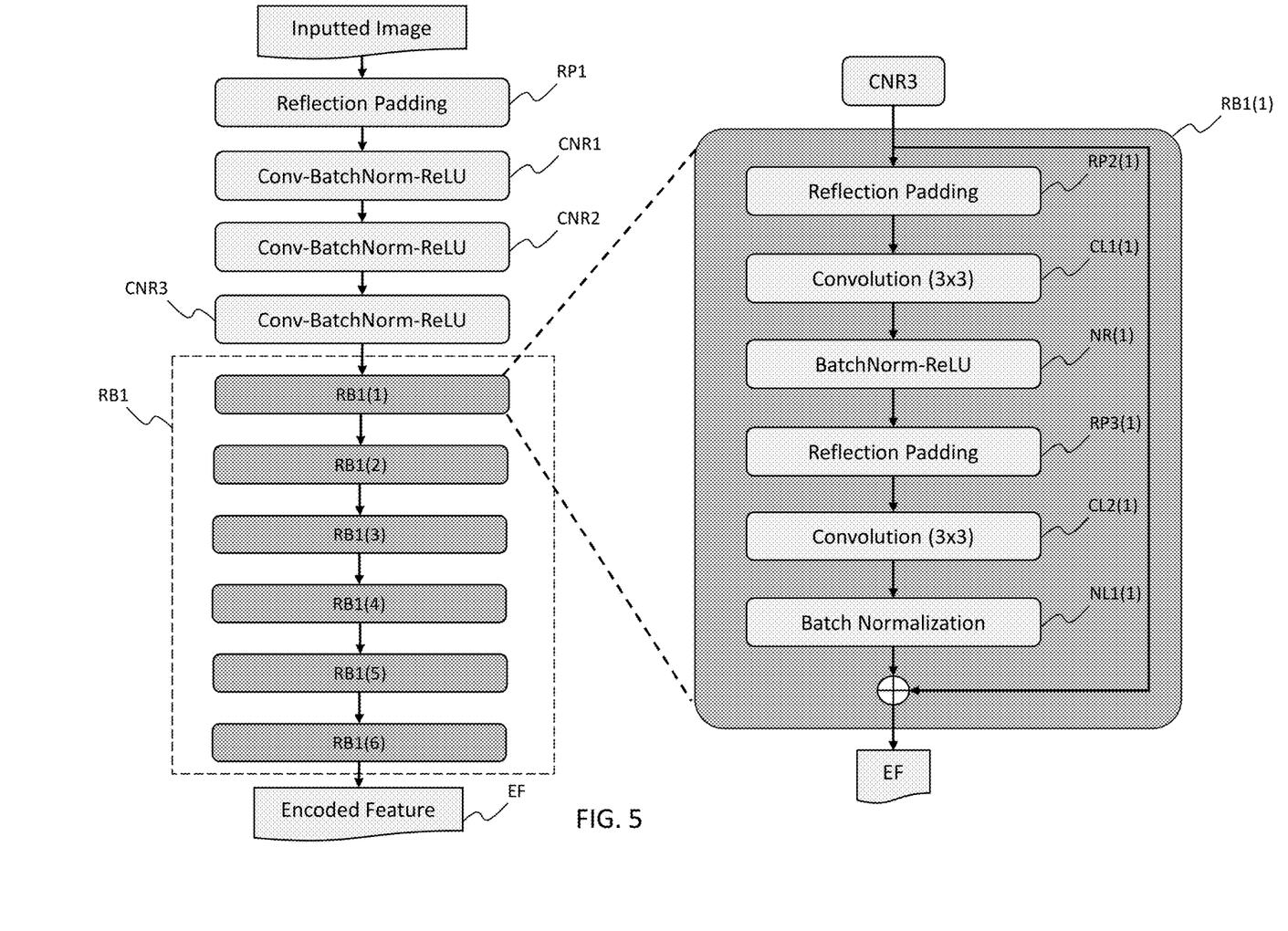
FIG. 5 depicts a schematic diagram illustrating an architecture of the DCNN model of an encoder of a generator of the crop yield estimation model in accordance with one embodiment of the present invention.

Referring to FIG. 5 for the following description. An architecture of the DCNN of the encoder EC comprises: a reflection padding layer RP1; three first set layers CNR1 to CNR3, wherein each of the first set layers CNR1 to CNR3 includes one convolution layer with kernel size of 3×3, one batch normalization layer, and one rectified linear unit (ReLU) layer; and a residual bottleneck layer RB1, wherein the residual bottleneck layer RB1 includes six groups of residual blocks RB1(1) to RB1(6) connected in sequence, and each of the six groups of residual blocks RB1(1) to RB1(6) comprises: one reflection padding layer; one convolution layer (e.g., CL1(1)) with kernel size of 3×3; one second set layer NR(1) including one batch normalization layer and one ReLU layer; one further reflection padding layer (e.g., RP3(1)); one further convolution layer with kernel size of 3×3 (e.g., CL2(1)); and one batch normalization layer (e.g., NL1(1)). The inputted image of the encoder EC is first inputted to the reflection padding layer RP1, and the outputted encoded feature ED is outputted by the residual bottleneck layer RB1.

Specifically, the input image is passed through a series of modules with the form convolution-BatchNorm-ReLU (e.g., first set layers CNR1 to CNR3) that progressively down-sample the input image, until the residual bottleneck layer RB1. However, the invention is not limited hereto. For example, the series of modules can be implemented with other form such as the Convolution-LayerNorm-ReLU. The features after down-sampling are reduced to ¼ of the original size of those of the input image. Next, the features are fed into residual bottleneck layer RB1, which is used to connect the backbone and decoders DC1 and DC2. The residual bottleneck layer RB1 refines the mapping from extracted features to the input of decoders DC1 and DC2.

Figure 6A:
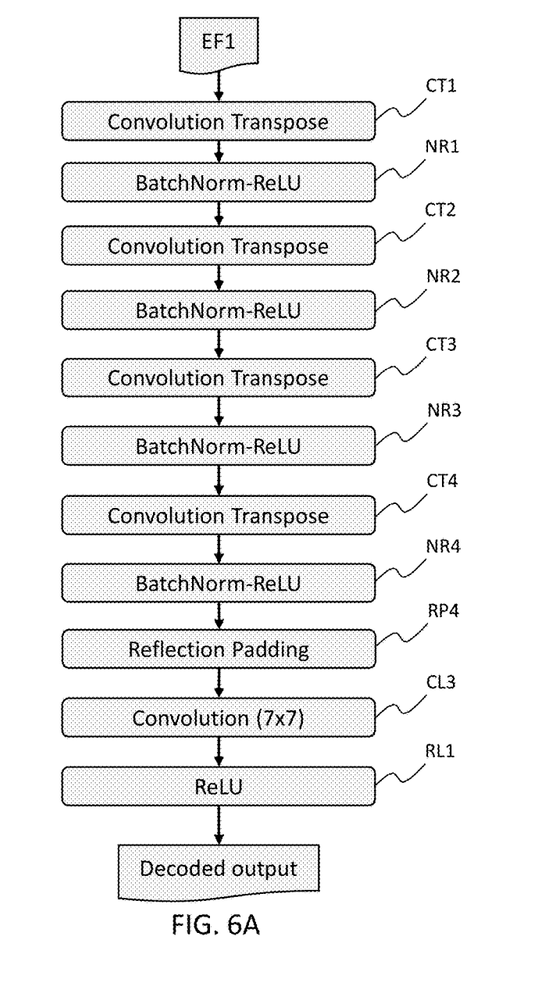
FIG. 6A depicts a schematic diagram illustrating an architecture of the DCNN model of a first decoder of the generator.

Referring to FIG. 6A for the following description. An architecture of the DCNN of the first decoder DC1 comprises: four pair layers CT1 and NR1 to CT4 and NR4, wherein each of the pair layers includes one convolution transpose layer with kernel size of 3×3 (e.g., CT1 to CT4) and one second set layer (e.g., NR1 to NR4); one reflection padding layer RP4; one convolution layer CL3 with kernel size of 7×7; and one ReLU layer RL1. Each of second set layers NR1 to NR4 includes one batch normalization layer and one ReLU layer. The first encoded features EF1 are inputted to the convolution transpose layer CT1, and the corresponding decoded outputs (e.g., the density maps DM1) are outputted by the ReLU layer RL1.

Figure 6B:
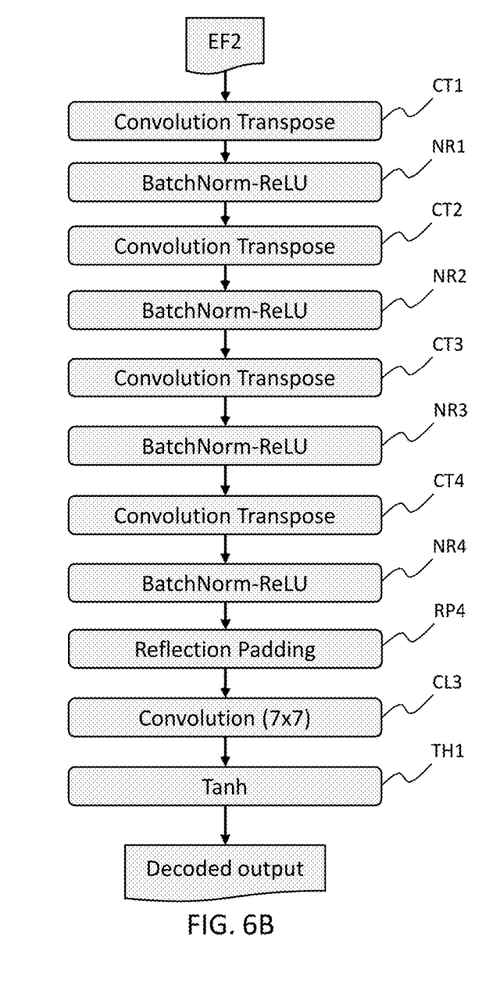
FIG. 6B depicts a schematic diagram illustrating an architecture of the DCNN model of a second decoder of the generator.

Referring to FIG. 6B for the following description. An architecture of the DCNN of the second decoder DC2 is similar to the first decoder's, comprising: four pair layers CT1 and NR1 to CT4 and NR4, wherein each of the pair layers includes one convolution transpose layer (e.g., CT1 to CT4) and one second set layer (e.g., NR1 to NR4); one reflection padding layer RP4; one convolution layer with kernel size of 7×7 CL3; and one hyperbolic tangent (Tanh) layer TH1. The second encoded features EF2 are inputted to the convolution transpose layer CT1, and the corresponding decoded outputs (e.g., the ab-channel images AB1) are outputted by the Tanh layer TH1.

First decoder DC1 and second decoder DC2 have similar network architectures except the number of the channel of their output layers. The output of first decoder DC1 is a single-channel image, while the output of second decoder DC2 is a two-channel image. Furthermore, each ConvolutionTranspose-BatchNorm-ReLU module (e.g., pair layer, CT1 and NR1) up-samples the features by transposed convolution which resizes the features to the size two times as big as the inputted encoded features.

Figure 7:
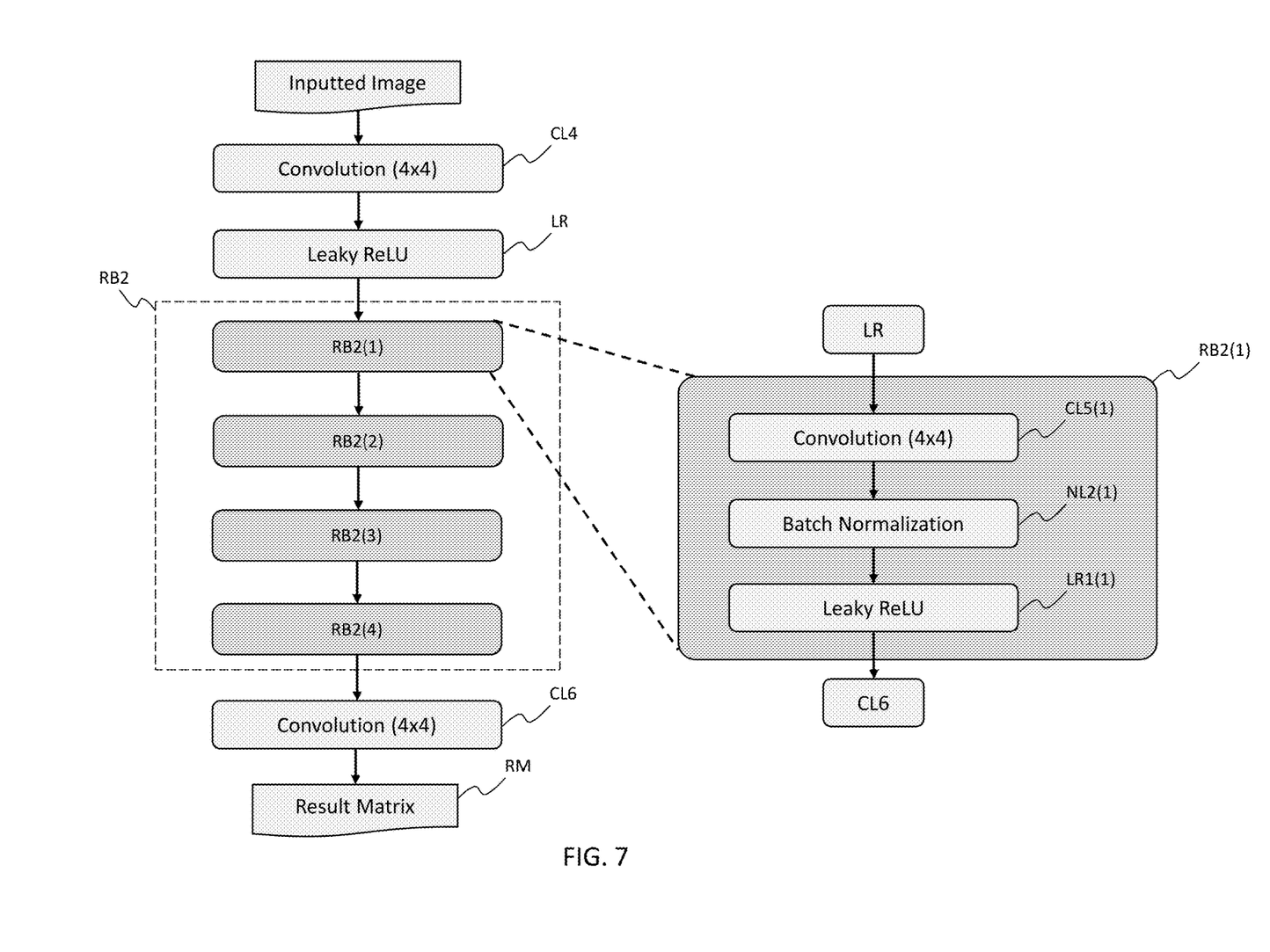
FIG. 7 depicts a schematic diagram illustrating an architecture of the DCNN model of a discriminator of the crop yield estimation model.

Referring to FIG. 7 for the following description. An architecture of the DCNN of the discriminator DS comprises: one convolution layer CL4 with kernel size of 4×4, is configured to receive inputted data (inputted image); one leaky ReLU layer LR; four groups (e.g., RB2(1) to RB2(4)) of residual blocks RB2; and one further convolution layer CL6 with kernel size of 4×4, configured to output a result matrix RM corresponding to the inputted data. Each (e.g., RB2(1)) of the four groups of residual blocks RB2 comprises: one further convolution layer with kernel size of 4×4 (e.g., CL5(1)); one batch normalization layer (e.g., NL2(1)); and one further leaky ReLU layer (e.g., LR1(1)). The sum of values of the result matrix RM indicates the final "fake or real" result made by the discriminator DS.

The discriminator 420 is implemented based on a convolution neural network. In one embodiment, the discriminator 420 is a PatchGAN network; however, the invention is not limited hereto. The final convolutional layer CL6 outputs two-channel feature maps. The size of feature maps passed through the discriminator 420 are progressively reduced. Each module/layer reduces the size of the feature maps by two times as big as the size of the input feature maps/images. Each element of the final feature map represents a patch of the input of the discriminator. The final feature map of the discriminator is trained to probe to be False or True, that means the discriminator is trained to classify a generated image or a real image by classifying patches of the image.

The whole DCNN of the crop yield estimation model 400 is an adversarial network, which is trained by a minimax loss, as defined in Equation (3). And the generated colorization images are used for training the encoder EC and the second decoder DC2 by maximizing the classification accuracy of output response (e.g., result matrix RM) from the discriminator 420 and minimizing the generation error of ab-channel images AB1. The encoder EC and the second decoder DC2 are trained relying on the both the discriminator loss and the generator loss.

The functional units of the apparatuses and the methods in accordance to embodiments disclosed herein, such as the processor of the analysis server, may be implemented using computing devices, computer processors, or electronic circuitries including but not limited to application specific integrated circuits (ASIC), field programmable gate arrays (FPGA), and other programmable logic devices configured or programmed according to the teachings of the present disclosure. Machine instructions or firmware/software codes running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The embodiments include non-transient memory circuits and/or computer storage media having data and/or machine instructions or firmware/software codes stored therein which can be used to program the processors to perform any of the methods of the present invention. The non-transient memory circuits and/or storage media include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units in accordance to various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium. The communication networks established in the various embodiments support various communication protocols such as, without limitation, Wi-Fi, the Global System for Mobile Communication (GSM) system, the Personal Handy-phone System (PHS), Code Division Multiple Access (CDMA) system, Worldwide Interoperability for Microwave Access (WiMAX) system, third-generation wireless communication technology (3G), fourth-generation wireless communication technology (4G), fifth-generation wireless communication technology (5G), Long-term Evolution technology (LTE), Bluetooth, and Ultra-Wideband (UWB).

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A computer-implemented method for performing a crop yield estimation in intelligent agriculture using a semi-supervised deep convolution neural network, comprising:
    receiving, by a processor of an analysis server, monitoring data from a drone, wherein the monitoring data comprises a video of one or more crops captured by the drone;
    sampling, by the processor, the video by a predefined frame rate to obtain one or more images;
    inputting, by the processor, the images to a crop yield estimation model to obtain result data, wherein the crop yield estimation model comprises a generator and a discriminator each comprising one or more deep convolution neural networks, and wherein the crop yield estimation model is trained by a semi-supervised learning method; and
    performing, by the processor, a quantity estimation corresponding to one or more of the crops as shown in each of the images according to the result data, so as to determine a total number of the crops; and
    wherein the semi-supervised learning method comprises:
    receiving training data comprising one or more images in RGB color space;
    inputting one or more first images to the generator to obtain one of more density map corresponding to the first images, wherein the first images are selected the images;
    inputting one of more second images to the generator to obtain one or more ab-channel images corresponding to the second images, wherein the second images are gray scale images obtained by performing a CIELAB color space transformation on one or more ex-first images, and wherein the ex-first are one or more of the images not selected for the first images;
    inputting the images and one or more ground-truth (GT) ab-channel images corresponding to the ab-channel images to a first loss function to output first loss data corresponding to the ab-channel images, wherein the GT ab-channel images are obtained by performing the CIELAB color space transformation on the ex-first images;
    inputting the density maps and one or more GT density maps corresponding to the density maps to a second loss function to output second loss data corresponding to the density maps, wherein the GT density maps are obtained by performing a gaussian distribution on one or more third images according to one or more indicators in each of the third images, wherein the third images are obtained by performing a preparation process to the first images, wherein a center of an impression of each of one or more crops in the third images is labelled by an indicator after the preparation process, and
    fine-tuning one or more first parameters of the generator according to the first loss data and the second loss data.

2. The method of claim 1, further comprising:
    performing a quality estimation corresponding to the crops according to the result data, so as to determine maturities of the crops.

3. The method of claim 1,
    wherein the generator comprises an encoder and two decoders; and
    wherein the semi-supervised learning method further comprises:
        inputting the first images to the encoder to obtain one or more first encoded features corresponding to the first images;
        inputting the second images to the encoder to obtain one or more second encoded features corresponding to the second images;
        inputting the first encoded features to a first decoder among the decoders to obtain the density maps corresponding to the first images; and
        inputting the second encoded features to a second decoder among the decoders to obtain the ab-channel images corresponding to the second images.

4. The method of claim 3, wherein the semi-supervised learning method further comprises:
    performing a RGB transformation on one or more feature concatenations of the ab-channel images and corresponding second images to obtain one or more colorization images; and
    performing an adversarial learning for training the discriminator and the generator according to the colorization images and one or more GT colorization images, wherein the GT colorization images are the ex-first images.

5. The method of claim 4, wherein an architecture of the DCNN of the encoder comprises:
    a reflection padding layer;
    three first set layers, wherein each of the first set layers includes:
        a convolution layer,
        a batch normalization layer, and
        a rectified linear unit (ReLU) layer; and
    a residual bottleneck layer, wherein the residual bottleneck layer includes six groups of residual blocks, and each of the six groups of residual blocks comprises:
        a reflection padding layer;
        a convolution layer with kernel size of 3×3;
        a second set layer including:
            a batch normalization layer, and
            a ReLU layer;
        a further reflection padding layer;
        a further convolution layer with kernel size of 3×3; and
        a batch normalization layer.

6. The method of claim 4,
    wherein an architecture of the DCNN of the first decoder comprises:
        four pair layers, wherein each of the pair layers includes a convolution transpose layer and a second set layer;
        a reflection padding layer;
        a convolution layer with kernel size of 7×7; and
        a ReLU layer;
    wherein an architecture of the DCNN of the second decoder comprises:
        four pair layers, wherein each of the pair layers includes a convolution transpose layer and a second set layer;
        a reflection padding layer;
        a convolution layer with kernel size of 7×7; and
        a hyperbolic tangent (Tanh) layer.

7. The method of claim 4, wherein an architecture of the DCNN of the discriminator comprises:
    a convolution layer with kernel size of 4×4, is configured to receive inputted data;
    a leaky ReLU layer;
    four groups of residual blocks, and each of the four groups of residual blocks comprises:

a further convolution layer with kernel size of 4×4;
a batch normalization layer; and
a further leaky ReLU layer; and
a further convolution layer with kernel size of 4×4, configured to output a result matrix corresponding to the inputted data.

8. The method of claim 4, wherein the adversarial learning comprises:
inputting the colorization images with one or more false indicators to the discriminator; and
inputting the GT colorization images with one or more true indicators to the discriminator, so as to fine-tune one or more second parameters of the discriminator to make the discriminator distinguish the colorization images as false and the GT colorization images as true; and
inputting one or more result matrices outputted by the discriminator to the generator to fine-tune one or more third parameters of the generator.

9. A computer-implemented method for training a crop yield estimation model in intelligent agriculture using a semi-supervised deep convolution neural network (DCNN), wherein the crop yield estimation model is executed by a processor of an analysis server, and the crop yield estimation model comprises a generator and a discriminator each comprising one or more DCNNs, the method comprising:
receiving, by the processor, training data comprising one or more images in RGB color space;
inputting, by the processor, one or more first images to the generator to obtain one or more density maps corresponding to the first images, wherein the first images are selected among the images;
inputting, by the processor, one or more second images to the generator to obtain one or more ab-channel images corresponding to the second images, wherein the second images are gray scale images obtained by performing a CIELAB color space transformation on one or more ex-first images, and wherein the ex-first are one or more of the images not selected for the first images;
inputting, by the processor, the ab-channel images and one or more GT ab-channel images corresponding to the ab-channel images to a first loss function to output first loss data corresponding to the ab-channel images, wherein the GT ab-channel images are obtained by performing the CIELAB color space transformation on the ex-first images;
inputting, by the processor, the density maps and one or more GT density maps corresponding to the density maps to a second loss function to output second loss data corresponding to the density maps, wherein the GT density maps are obtained by performing a gaussian distribution on one or more third images according to one or more indicators in each of the third images, wherein the third images are obtained by performing a preparation process to the first images, wherein a center of each of one or more crops in the third images is labelled by an indicator after the preparation process;
fine-tuning, by the processor, one or more first parameters of the generator according to the first loss data and the second loss data; and
performing, by the processor, an adversarial learning for training the generator and the discriminator according to one or more colorization images and one or more GT colorization images, wherein the GT colorization images are the ex-first images and the colorization images are generated by the ab-channel images and the second images.

10. The method of claim 9, wherein after the generator and the discriminator are trained by the training data, performing a crop yield estimation, the crop yield estimation comprising:
receiving monitoring data from a drone, wherein the monitoring data comprises a video of one or more crops captured by the drone;
sampling the video by a predefined frame rate to obtain one or more images;
inputting the images to the trained crop yield estimation model to obtain result data; and
performing a quantity estimation corresponding to one or more of the crops as shown in each of the images according to the result data, so as to determine a total number of the crops.

11. An analysis server for performing a crop yield estimation in intelligent agriculture using a semi-supervised deep convolution neural network, comprising:
a processor configured to execute machine instructions to implement a computer-implemented method, the method comprising:
receiving, by the processor, monitoring data from a drone, wherein the monitoring data comprises a video of one or more crops captured by the drone;
sampling, by the processor, the video by a predefined frame rate to obtain one or more images;
inputting, by the processor, the images to a crop yield estimation model to obtain result data, wherein the crop yield estimation model comprises one generator and one discriminator each comprising one or more deep convolution neural networks, and the crop yield estimation model is trained by a semi-supervised learning method; and
performing, by the processor, a quantity estimation corresponding to one or more of the crops as shown in each of the images according to the result data, so as to determine a total number of the crops, and
wherein the semi-supervised learning method comprises:
receiving training data comprising one or more images in RGB color space;
inputting one or more first images to the generator to obtain one of more density map corresponding to the first images, wherein the first images are selected the images;
inputting one of more second images to the generator to obtain one or more ab-channel images corresponding to the second images, wherein the second images are gray scale images obtained by performing a CIELAB color space transformation on one or more ex-first images, and wherein the ex-first are one or more of the images not selected for the first images;
inputting the images and one or more ground-truth (GT) ab-channel images corresponding to the ab-channel images to a first loss function to output first loss data corresponding to the ab-channel images, wherein the GT ab-channel images are obtained by performing the CIELAB color space transformation on the ex-first images;
inputting the density maps and one or more GT density maps corresponding to the density maps to a second loss function to output second loss data corresponding to the density maps, wherein the GT density maps are obtained by performing a gaussian distribution on one or more third images according to one or more indicators in each of the third images, wherein the third images are obtained by performing a preparation process to the first images, wherein a center of an impression of each of one or more crops in the third images is labelled by an indicator after the preparation process, and fine-tuning one or more first parameters of the generator according to the first loss data and the second loss data.

* * * * *